United States Patent
Avritch et al.

(10) Patent No.: US 6,360,290 B1
(45) Date of Patent: Mar. 19, 2002

(54) COMMERCIAL STANDARD DIGITAL BUS INTERFACE CIRCUIT

(75) Inventors: Steven A. Avritch, Bristol; Christopher E. Paul, West Hartford; Mark A. Foss, Wethersfield, all of CT (US)

(73) Assignee: United Technologies Corporation, Windsor Locks, CT (US)

( * ) Notice: Subject to any disclaimer, the term of this patent is extended or adjusted under 35 U.S.C. 154(b) by 0 days.

(21) Appl. No.: 09/338,722

(22) Filed: Jun. 23, 1999

(51) Int. Cl.<sup>7</sup> ............................................. G06F 13/42
(52) U.S. Cl. ...................................... 710/105; 710/104
(58) Field of Search ........................ 710/53, 306, 305, 710/110, 113, 105; 709/249; 701/14, 35; 712/40, 37; 714/47

(56) References Cited

U.S. PATENT DOCUMENTS

| | | | |
|---|---|---|---|
| 4,453,229 A | 6/1984 | Schaire | 356/949 |
| 4,625,307 A | 11/1986 | Tulpule et al. | 370/85 |
| 4,991,085 A * | 2/1991 | Pleva et al. | 326/82 |
| 5,029,074 A * | 7/1991 | Maskas et al. | 710/129 |
| 5,043,877 A * | 8/1991 | Berger et al. | 710/110 |
| 5,083,259 A * | 1/1992 | Maresh et al. | 710/126 |
| 5,129,062 A * | 7/1992 | Gygi et al. | 710/34 |
| 5,191,653 A * | 3/1993 | Banks et al. | 710/113 |
| 5,224,213 A | 6/1993 | Dieffenderfer et al. | 395/250 |
| 5,349,685 A | 9/1994 | Houlberg | 395/800 |
| 5,377,109 A | 12/1994 | Baker et al. | 364/424.06 |
| 5,581,741 A | 12/1996 | Clark et al. | 395/500 |
| 5,805,828 A | 9/1998 | Lee et al. | 395/200.79 |

* cited by examiner

Primary Examiner—Rupal Dharia (57) ABSTRACT

Interface apparatus is adapted for interconnection between a host computer and a Commercial Standard Digital Bus (CSDB) for translating the CSDB signal protocol of the data frames provided over the bus by different signal sources into a signal format which is compatible with the host computer.

18 Claims, 6 Drawing Sheets

COMMERCIAL STANDARD DIGITAL BUS INTERFACE CIRCUIT

DESCRIPTION

1. Technical Field

This invention relates to digital signal busses, and more particularly to signal bus interface circuitry.

2. Background Art

The cockpit instrumentation of modern day commercial aircraft has become increasingly complex with the need for functional integration of the flight systems equipment. This requires communications between cockpit instruments, radios and navigational display devices. Specifically, the navigation and communication radios (NAVCOM's) exchange signal information with other cockpit instruments over a digital signal bus standard known as the Commercial Standard Digital Bus (CSDB). The CSDB is functionally defined by the Collins Corporation Standard 523-0772774.

Aircraft flight control computers, such as the Aircraft System Computer (ASC) designed by the Hamilton Standard Division of United Technologies Corporation for the Sikorsky Aircraft Corporation commercial Model S92 helicopter, must also communicate with each of the aircraft's various instruments and sensors, including the NAVCOM's. The ASC receives sensor data through the CSDB and presents flight data information on the CSDB to the cockpit displays. This requires translation of signal protocols between the ASC and the CSDB.

Although certain other aircraft signal buses, such as the military standard for digital signal buses (MIL-STD 1553) and the avionics bus standard (ARINC 429), have commercially available interface devices for translating protocols among the different bus connected equipment, no such similar interface device exists for the CSDB. While it is possible to incorporate a microcontroller or microprocessor-based solution to provide this interface, the high costs of the required microprocessor components and the software make this an expensive solution.

DISCLOSURE OF INVENTION

One object of the present invention is to provide a full feature CSDB interface in hardware-based circuitry capable of receiving CSDB protocol data frames from several different signal sources.

According to the present invention, interface apparatus is adapted for interconnection between a host computer and the CSDB for receiving data frames from different identified signal sources in CSDB format, translating the received CSDB signal protocol into a form compatible with the host computer, and storing the translated messages in signal memory which is accessible to the host processor. In further accord with the invention, the memory is segregated into groups of addressable locations, each group being assigned to receive the translated protocol data signals from a different one of the identified signal sources.

In still further accord with the invention, different subgroups of addressable memory locations are designated within each parent address group for receiving and storing therein the translated protocol data signals from a common signal source, but having different subject content. In still yet further accord with the present invention each of the subgroups have a designated primary and secondary address location to which succeeding units of the translated protocol signal data is stored by the interface and retrieved by the host computer, in ordered, cyclic fashion, thereby providing for a fast and efficient transfer of the translated data to the host computer.

The CSDB interface of the present invention is a hardware based interface capable of translating the CSDB protocol encoded data from a number of different signal sources, at high transfer rates, to a format acceptable to the host computer. The interface notifies the host of the receipt of each CSDB data frame, as well as the storing of each message of the frame, and the host acknowledges its retrieval of each stored message. As a result the messages are transferred in a synchronized manner to preserve data coherency and without loss of bit content.

Within the interface apparatus, the synchronization of store and retrieve is established by address generation logic circuitry in conjunction with ping-pong buffer logic (PPBL) and memory arbitration logic (MAL). By double buffering incoming messages the PPBL ensures data coherency; i.e. that all data bytes within a message block come from the same transmission,. The PPBL coordinates the double buffering with the host computer to provide this data coherency. The final product of the interface apparatus is a plurality of presorted messages, which are stored in pre-assigned, deterministic locations in the shared memory. The PPBL notifies the host processor of each message address location which allows the processor to directly read the data out of the shared memory and to notify the PPBL when the processor completed message access.

The present interface apparatus may include a plurality of individual serial receivers to permit the simultaneous receipt and translation of signal data from a plurality of different CSDB, and presenting this translated data to the host computer. This autonomous interface to multiple CSDB busses dramatically reduces the complexity and throughput requirements of the host computer itself, thereby reducing overall system cost.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
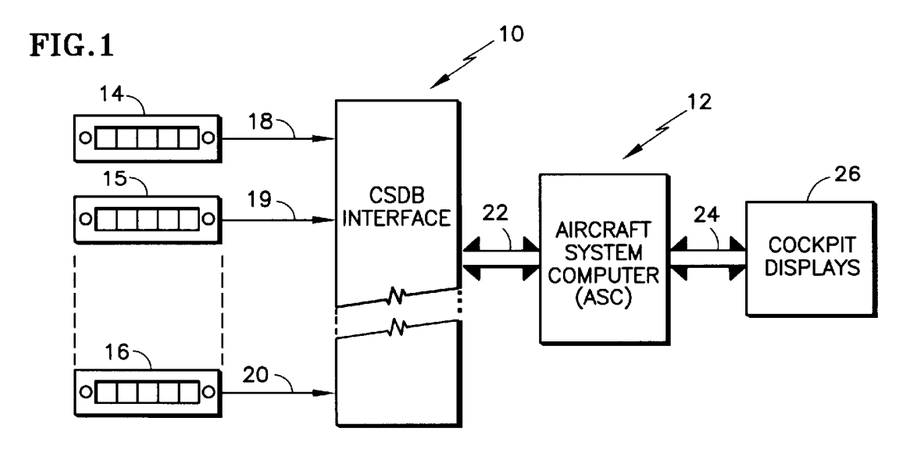
FIG. 1 is a block diagram illustration of one application in which the present invention may be used.

FIG. 1 is a simplified block diagram of the interconnection of the CSDB interface apparatus 10 of the present invention with an Aircraft System Computer (ASC) 12. The interface apparatus 10 receives sensed aircraft flight data signals from several different signal sources, such as the NAVCOMs 14–16 on bus lines 18–20. The data signals are formatted in CSDB signal protocol. The interface 10 translates the CSDB protocol and provides the translated NAV- COM data on lines 22 to the ASC 12. The ASC converts the received flight data to a graphical data format and presents it through lines 24 to cockpit displays 26.

Figure 2:
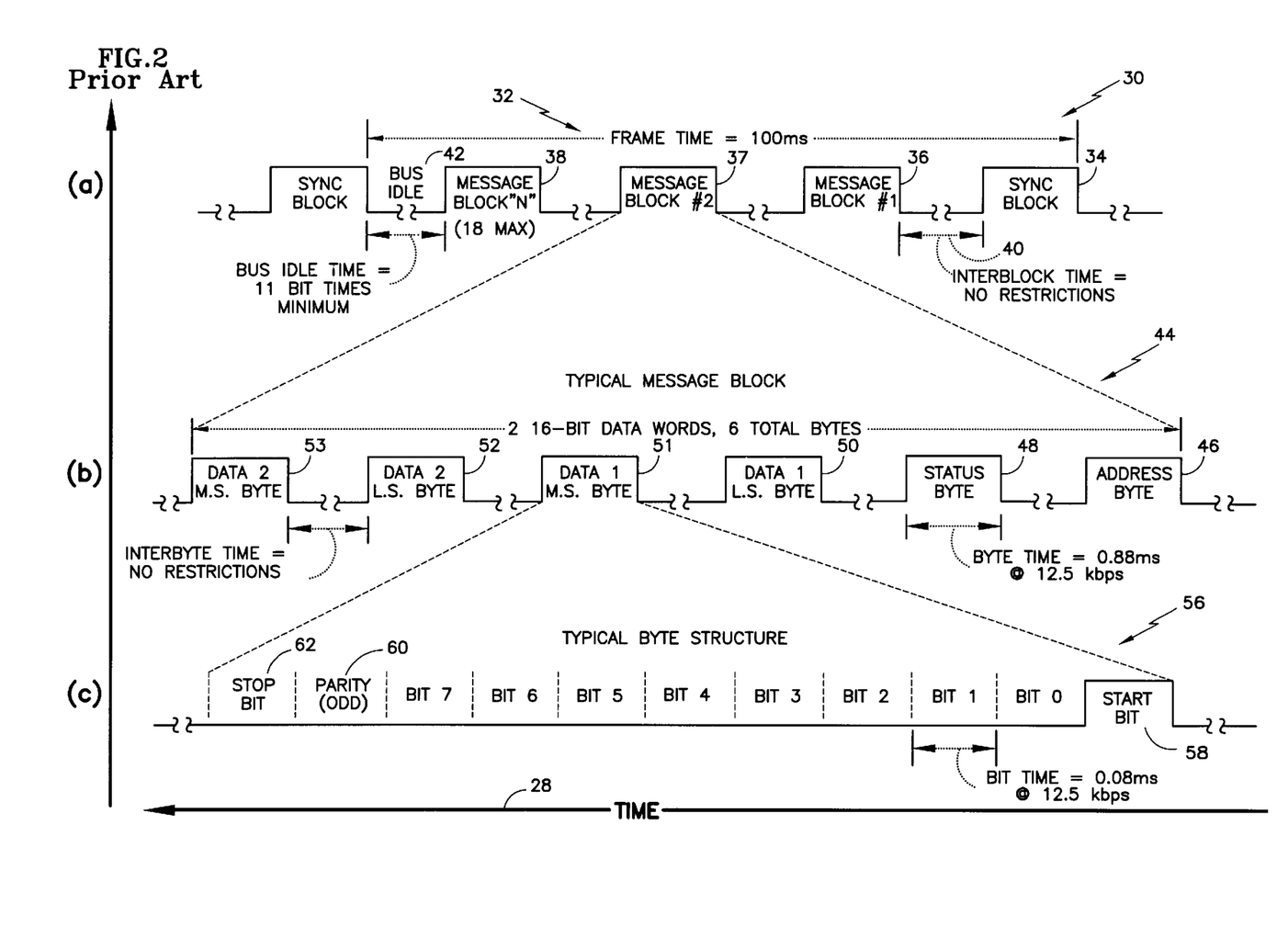
FIG. 2 is a waveform illustration of the Prior Art CSDB signal format, which is used in the description of the present invention.

FIG. 2, illustrations (a) through (c), depict the CSDB signal protocol in a series of exemplary, time-based waveforms, where the abscissa 28 illustrates time as increasing from right to left. The data from the signal sources 14–16 is provided in message blocks and the message blocks from different signal sources is bundled in separate frames. Illustration (a), waveform 30 represents a CSDB message frame 32, which has a frame interval time of 100 milliseconds ($100 \times 10^{-3}$ seconds). Each frame includes a synchronization ("sync") block 34 followed by a plurality of message blocks 36–38. Depending on the application requirements, the frame may include up to a maximum of eighteen message blocks. As known to those skilled in the art, the actual number of message blocks within a frame varies in dependence on the interblock time interval 40; which is a selectable parameter. Each frame ends with a bus idle interval 42, having a minimum time interval of eleven bit times.

Each of the signal sources 14–16 typically provides data on several different subjects, such that each frame, although associated with a common signal source, includes message blocks which include varied subject matter content. Each of these message blocks 36–38 includes six bytes, as shown for message block 37 by the waveform 44 of illustration (b). This includes an address byte 46 which identifies the subject content of the message block, a status byte 48, and data bytes 50–53. At a signal speed of 12.5 Kbps ($12.5 \times 10^3$ bits per second) the byte time interval is substantially 0.88 milliseconds ($0.88 \times 10^{-3}$ seconds). The data bytes 50, 51 and 52, 53 comprise two 16 bit data words, with bytes 50, 51 representing the least significant (LS) byte (50) and the most significant (MS) byte (51) of the first data word, and bytes 52, 53 representing the LS and MS bytes of the second word. Each of the data bytes 50-53, as shown with waveform 56 of illustration (c) for data byte 51, includes eight data bits (Bit 0–Bit 7) together with a Start Bit 58, a Parity (odd) Bit 60, and a Stop Bit 62; a total 11 bits, each at a bit time of 0.08 milliseconds ($0.08 \times 10^{-3}$ seconds) for a byte interval time of 0.88 milliseconds ($0.88 \times 10^{-3}$).

As known, the parity bit 60 checks that data has been transmitted accurately and the bit is set so that all bytes have either an odd number or an even number of set bits. In the best mode embodiment of the invention the parity is odd. Therefore, as the transmitting device sends data, it counts the number of set bits in each group of data bits. If the number of set bits is even, it sets the parity bit to 0; if the number of set bits is odd it sets the parity bit to 1. In this way, every byte has an even number of set bits. On the receiving side, the device checks each byte to make sure that it has an even number of set bits. If it finds an odd number of set bits, the receiver knows there was an error during transmission.

Similarly, as known, the data transmission over the CSDB is asynchronous, that is, the frames do not occur at predetermined or regular intervals but can be transmitted intermittently rather than in a steady stream. The difficulty with asynchronous communications is that the interface apparatus, as the receiver, must have a way to distinguish between valid data and noise. This is accomplished through use of the start bit 58 and stop bit 62 at the beginning and end of each data byte.

Figure 3:
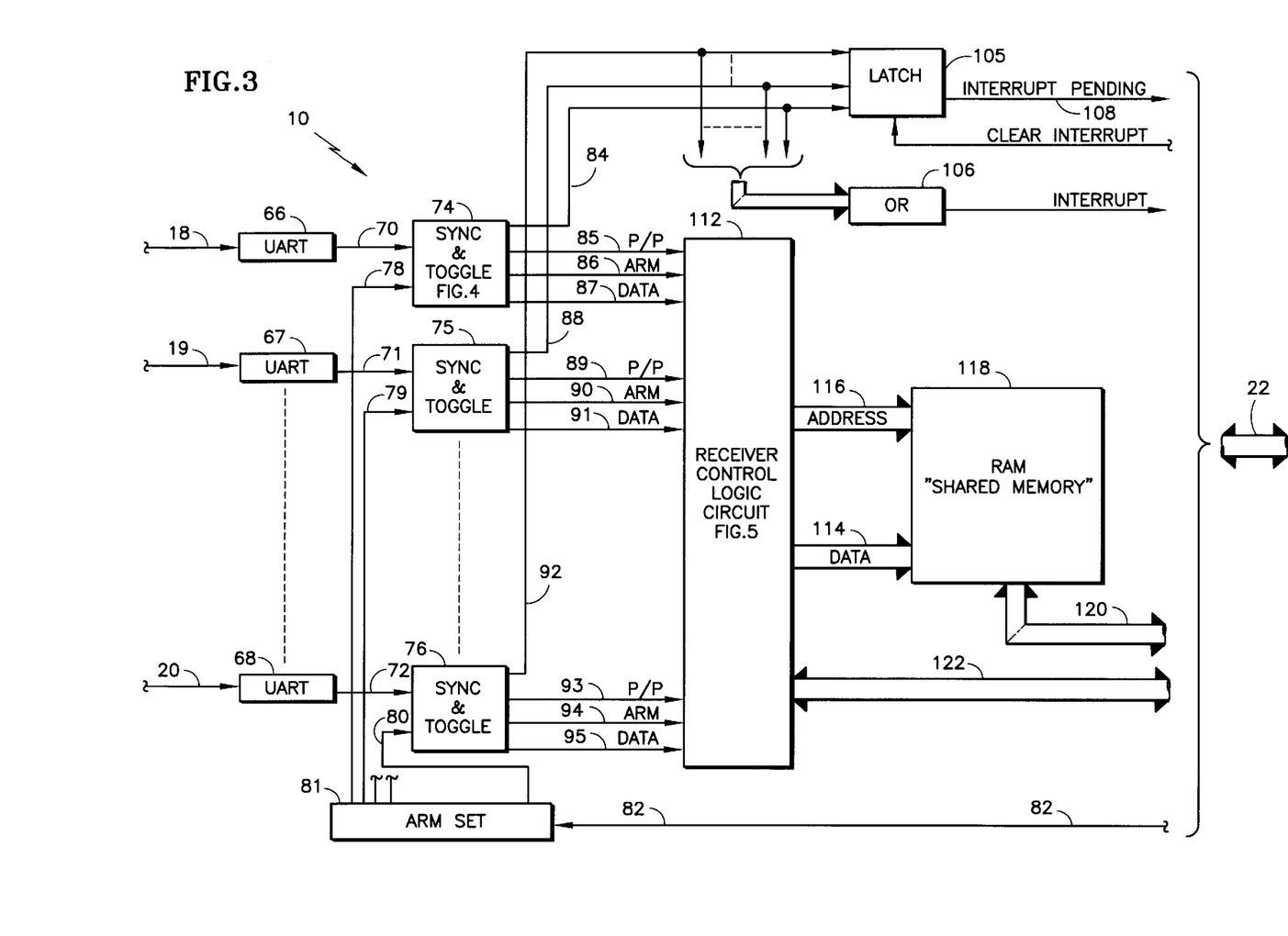
FIG. 3 is a system block diagram of a best mode embodiment of the present invention.

FIG. 3 is a system block diagram of a best mode embodiment of the CSDB interface 10 of FIG. 1. In the best mode embodiment the interface is shown to include several different channels, up to six, to provide the protocol translation of incoming signals from six different CSDB busses. It should be understood, however, that the interface may include only a single channel.

The sensed flight data is received in CSDB signal protocol on lines 18–20 at each of a plurality of Universal Asynchronous Receiver Transmitters (UARTs) 66–68. The UARTs 66–68 are of a known type, which handles the CSDB asynchronous serial communications at a signal speed of substantially 12.5 Kbps. The UARTs buffer the incoming data, thereby allowing the interface apparatus to manage its serial ports, especially in the event of "bursty" data traffic, and present the received serial data through output lines 70–72 to associated synchronization ("synch") and toggle logic circuits 74–76.

Each synch and toggle logic circuit 74–76 also receive an ARM signal on lines 78-80 from ARM set circuitry 81. The ARM signal is an enable command from the ASC 12 and provided to the ARM circuitry 81 on lines 82, which are included in the trunk lines 22 (FIG. 1) that interconnect the CSDB 10 and ASC 12. As described in detail with respect to FIG. 4, the toggle circuit 74–76 provide four output signals, on lines 84–87, 88–91, and 92–95, respectively. These include a synchronization signal, a "ping-pong" signal, an ARM signal, and the received CSDB data signal.

Figure 4:
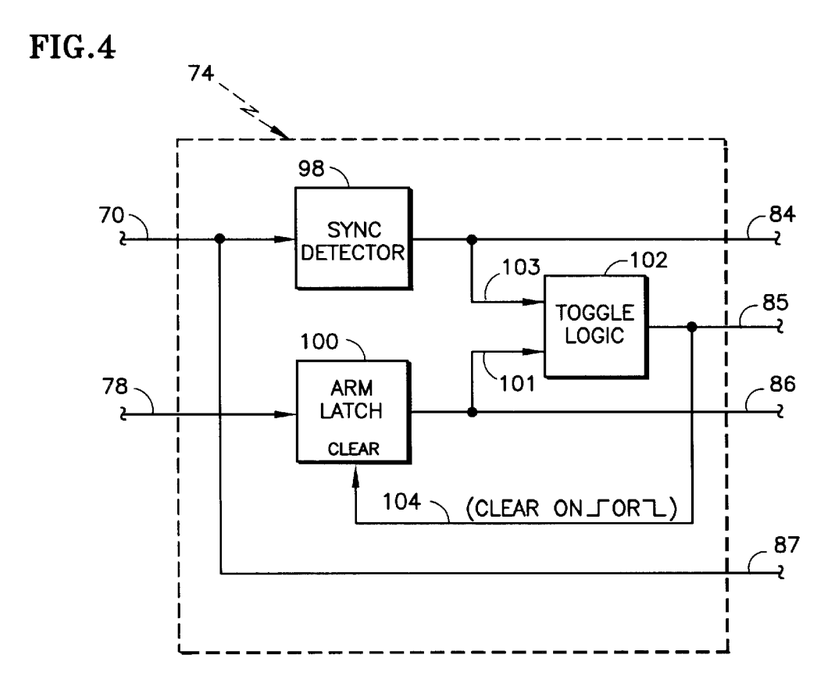
FIG. 4 is a schematic illustration of one element in the embodiment of FIG. 3.

Referring now to FIG. 4, which is a system block diagram of the synch and toggle circuit 74 of FIG. 3. The incoming serial data from UART 66 (FIG. 3) on lines 70 is presented to synch detector circuit 98. The circuit 98 detects the presence of a CSDB message frame synch block 34 (FIG. 2) with the appearance of six consecutive bytes of A5 hexadecimal (decimal 165; or binary 10100101) and, in response, provides a discrete synch signal pulse at an enable state (e.g. logic one state) on line 84. The ARM signal on line 78 is a bi-state enable-disable signal which is set and re-set by the ARM circuitry 81 (FIG. 2) under the control of the ASC 12. The ARM enable signal state is typically a binary logic one. The signal is received at ARM latch circuit 100, which latches the enable state at a first input 101 of toggle logic circuit 102, the second input 103 of which receives the synch detector discrete signal on line 84.

The toggle logic 102 provides a bi-state output signal on line 85, referred to as a ping pong signal, which toggles between signal states at each occurrence of the concurrent presence of an ARM enable signal state at its input 101 and a synch detector enable signal state at its input 103. In operation the CSDB interface apparatus 10 stores consecutive CSDB messages, alternately, in one of two address locations in signal memory which are accessible to the CSDB interface and the ASC 12. These memory locations are referred to as primary and secondary and each are associated with a corresponding one of the two states of the bistable ping pong signal. As an example, as the interface 10 writes a present CSDB message to the primary memory location, which corresponds to a present state of the line 85 ping pong signal, the ASC 12 reads the preceding stored CSDB message from the secondary address location, which corresponds with the preceding state of the ping pong signal. When the ASC 12 has completed the message retrieval from the memory's secondary location it resets the ARM signal on line 86 to an enable state, which causes the ping pong signal to transition states on line 85 on the occurrence of the next synch detector enable state. The ping-pong signal state transition is coupled back on line 104 to a "clear" input of the ARM hatch 100, thereby resetting the latch output. The synchronization and toggle circuit 74 provides the ARM signal at output line 86, and also passes the data signal through to output line 87.

Referring again to FIG. 3, the synch signal pulses from the synch and toggle circuits 74–76 are presented to ASC interrupt circuitry, including a latch 105 and an OR gate 106. The presence of a synch signal indicates the beginning of a CSDB message block, and it sets the latch to a "synch state", which signals an "interrupt pending" notice to the ASC 12 (FIG. 1), which accesses the latch on lines 108, which are included in lines 22 (FIG. 1). This forewarns the ASC that a translated CSDB message will be provided shortly. The remaining output signals from each of the synch and toggle circuits 74–76, including the ping-pong (P/P) signal, the ARM signal, and the CSDB serial data, are presented to receiver control logic (RCL) circuit 112.

As described in detail hereinafter with respect to FIGS. 5 and 6, the RCL circuit 112 includes a plurality of receivers; one associated with each of the UART incoming data channels. Each receiver decodes the received CSDB signal protocol to: (i) identify the message type being received, (ii) to detect for errors in parity, byte content, and frame content, and (iii) to detect CSDB protocol errors, such as incorrect numbers of bytes being transferred for a message. The RCL provides an equivalent translated format signal on lines 114, together with a message address on lines 116 which defines the one of two alternate (primary and secondary) storage locations for the translated message in non-volatile, random access memory (RAM) 118 which is accessible to the ASC 12 through lines 120 of the trunk lines 22 (FIG. 1).

The RCL decoded message is stored in RAM 118 at an address determined by the combination of the RCL's address generation logic circuitry in conjunction with ping-pong buffer logic (PPBL) circuitry and memory arbitration logic (MAL) circuitry. The signal storage locations in the RAM 118 are mapped to provide designated storage areas for the translated protocol signals based on the translated signal's characteristics. The higher level map provides different groups of addressable storage locations; each of which are associated with each of a different one of the signal sources providing data to the host computer. The next level of mapping partitions each of the groups into one or more sub-groups. Each of the different sub-groups within a parent group are associated with different subject content from among the message blocks received from a common signal source. In this way the received data is compartmentalized for fast access and retrieval by the host computer.

The PPBL ensures data coherency; i.e. that all data bytes within a message block come from the same transmission, by double buffering incoming messages. The PPBL coordinates the double buffering with the ASC 12 to provide this data coherency. The final product of the CSDB interface 10 is a plurality of presorted messages, which are stored in pre-assigned, deterministic locations in the shared memory. The PPBL notifies the host processor of each message address location through address lines 116 which allows the processor to directly read the data on lines 114 out of the shared memory and to notify the PPBL through lines 122 when the CPU has completed message access.

Figure 5:
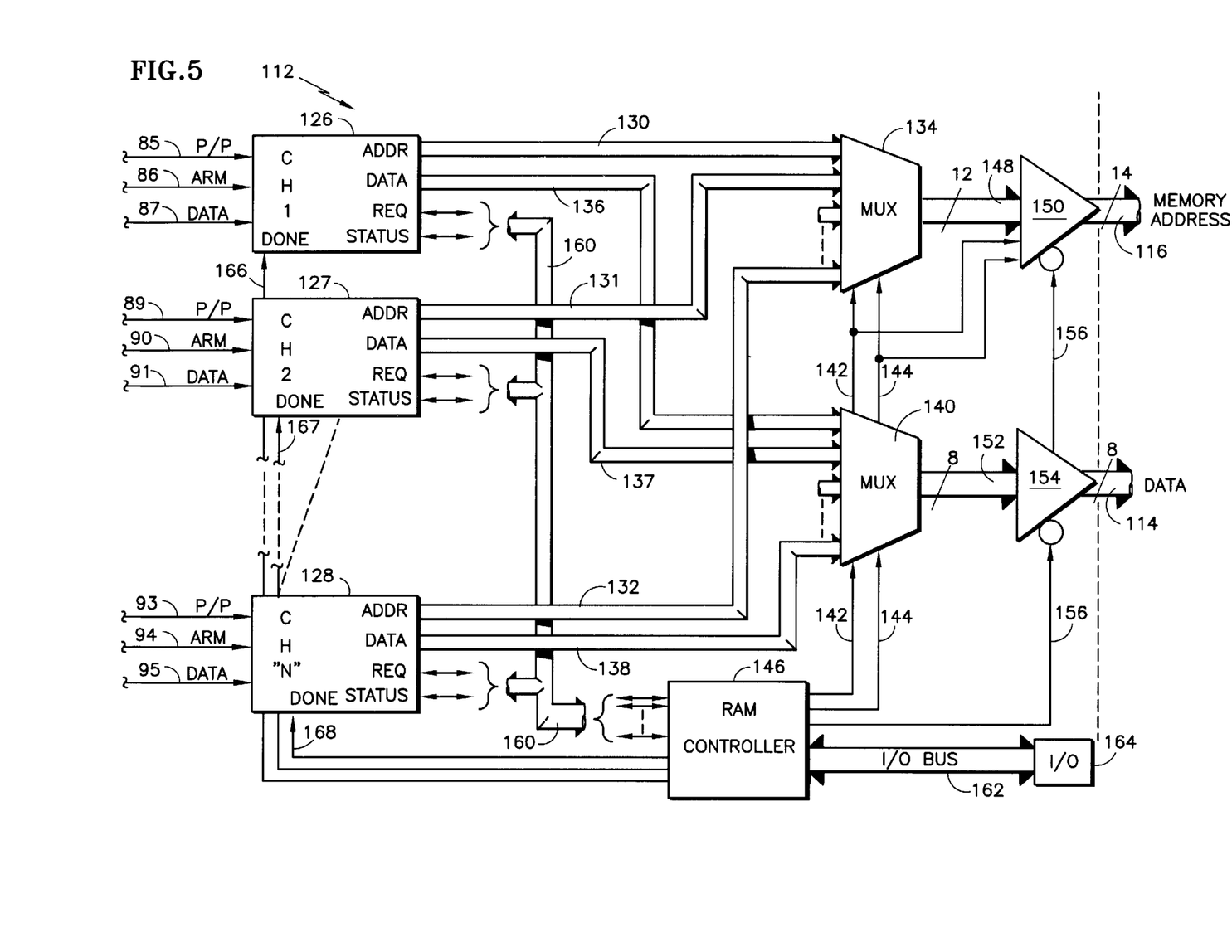
FIG. 5 is a detailed system block diagram of another element shown in the embodiment of FIG. 3.

Referring now to FIG. 5, which is a system block diagram of the RCL 112 of FIG. 3. The RCL includes a plurality of channel receivers 126–128, one each associated with each of the UARTs 66–68. In a best mode embodiment the interface includes six channels, corresponding to six UARTs and six channel receivers. Each channel receiver 126–128 receives the P/P, ARM, and data signals from each of the associated synch and toggle circuits 74–76. As described hereinafter with respect to FIG. 6 each channel receiver 126–128 provides a 12-bit address signal on lines 130–132 to an N input multiplexer (MUX) 134, which in the preferred embodiment is a 6 to 1 MUX. The 12-bit signal comprises an 8-bit storage address location in RAM 118 (FIG. 3), a three bit UART identification number which uniquely identifies the particular channel receiver providing the data messages, and a one bit ping-pong signal. The channel receivers provide the data as eight bit data words on lines 136–138 to MUX 140 which is also a 6 to 1 MUX in the best mode embodiment.

The MUXes 134, 140 time division multiplex (TDM) the individual channel addresses and data words under control of a RAM controller 146. The present count of a two bit counter is provided by the RAM controller to each of the MUXes 134, 140 on lines 142–144. The 12-bit address signal from the MUX 134 is provided on lines 148 to an amplifier 150 which also receives the serial bit signals on lines 142, 144, to provide a 14-bit memory address signal on the RCL 112 address signal lines 116. The MUX 140 provides each of the messages from each of the channel receivers in TDM signal format on output lines 152 to amplifier 154. The amplifiers 150, 154 are each gate enabled by a signal on lines 156 from the RAM controller 146. When enabled, amplifier 154 provides the 8-bit data signal on the RCL output data lines 114.

In addition to the CSDB translated data on lines 136–138 and RAM address on lines 130–132, each of the receiver channels 126–128 also provides message status parameters on lines 160 to the RAM controller 146. The RAM controller in turn provides the message status information on input/output (I/O) bus 162 to an I/O interface 164, where they may be accessed through lines 122 (FIG. 3) by the ASC 12 (FIG. 1).

Figure 6:
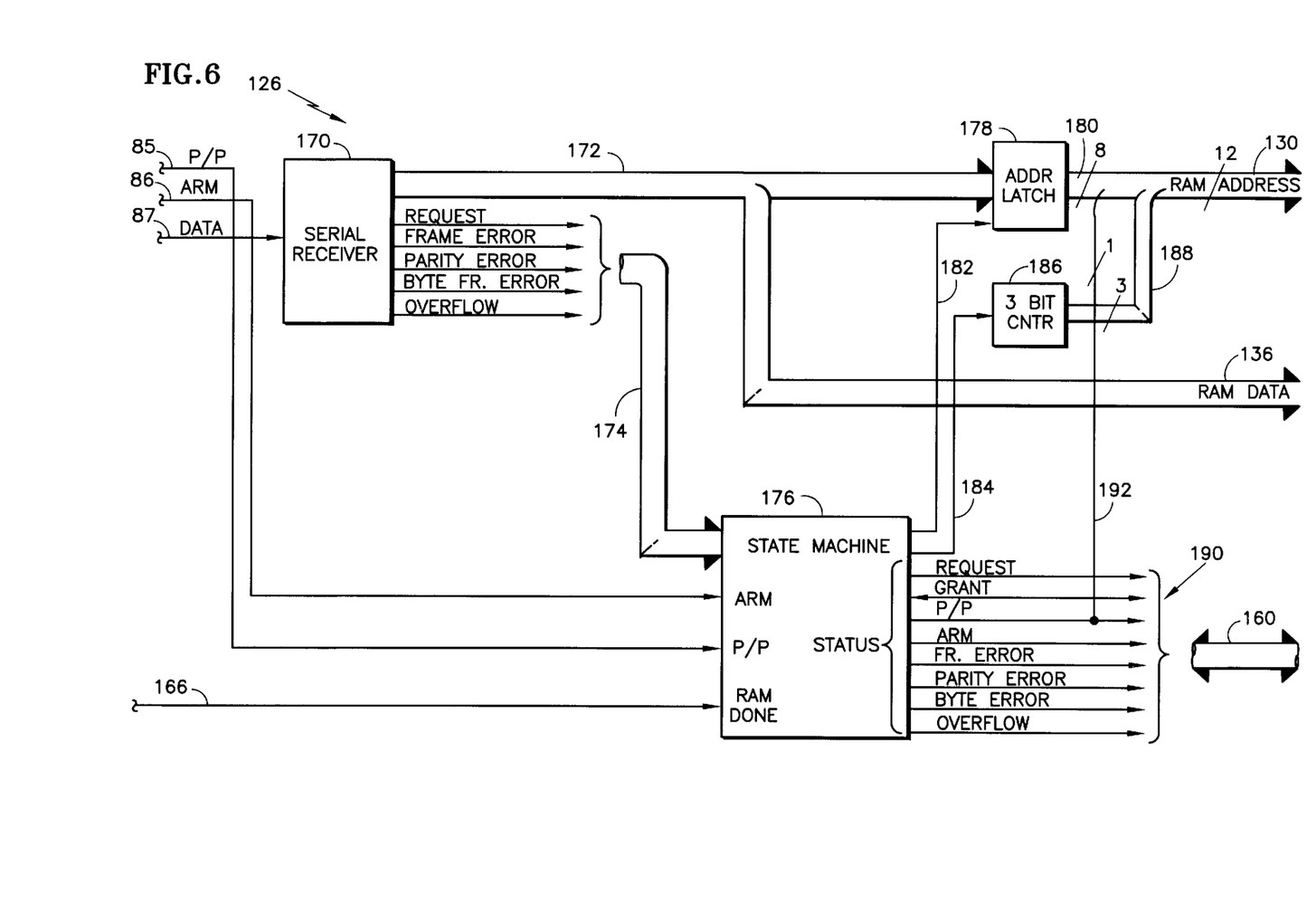
FIG. 6 is a schematic illustration of one of the elements shown in the block diagram of FIG. 5.

FIG. 6 is a block diagram of the channel receiver 126 of FIG. 5. The channel receiver includes a known type serial UART receiver 170 which receives the CSDB serial messages on line 87 and separates each frame's address and data (address byte 46 and data bytes 50–53, FIG. 2) on output lines 172. The serial receiver further provides the message block status parameters on output lines 174. The status information is contained in status byte 48 (FIG. 2) and includes: Request, Frame Error, Parity Error, Byte Frame Error, and Overflow. The status information is provided through lines 174 to the channel receiver state machine 176, which also receives the ARM signal on line 86, the P/P signal on lines 85, and the RAM Done signal on lines 166.

In operation, the serial receiver 170 processes the CSDB message block serially, first presenting the content of the address byte 46 (FIG. 2) through lines 172 to an address latch circuit 178 which presents the 8-bit address on lines 180 in response to a strobe enable signal provided on lines 182 from the state machine 176. The state machine provides the strobe enable in response to a RAM Done signal on line 166 from the RAM controller 146 (FIG. 5). This indicates that the preceding message data has been written into the RAM 118 (FIG. 3) such that the new address may be written onto lines 180. The state machine 176 also provides a UART identification signal on lines 184.

Although the best mode embodiment of the interface apparatus includes six channel receivers, it should be understood that any number of receivers may be used as deemed necessary, or suitable, by those skilled in the art, for a given application. If the number of receiving channels is increased beyond six then the bit content of the UART identification signal would accordingly increase. In the present embodiment, the UART identification signal on line 184 is presented to a 3-bit counter 186 which identifies the particular UART (in the instant case, it is UART 66 which is presented to channel receiver 1) (126, FIG. 5), and so the output of the 3-bit counter equals 001 on output lines 188.

As described hereinbefore, each channel receiver writes its message data to one of two alternate RAM addresses, as determined by the state of the P/P signal on lines 85. The P/P signal is passed through the state machine 176 as one of the plurality of status parameters on lines 190. In particular, the P/P signal is presented through line 192 to the output lines 180 of the address latch 178. The sum of the 8-bit address from the latch 178, the 1-bit P/P signal on line 192, and the 3-bit counter on lines 188 provide the 12-bit RAM address signal on the channel 1 receiver 126 address lines 130 (FIG. 5). Following the presentation of the address byte and status byte contents, the serial receiver provides the contents of the data bytes (50–53, FIG. 2) and two 16-bit data words on line 172, which are provided at the channel 1 receiver output on branch lines 136.

Figure 7:
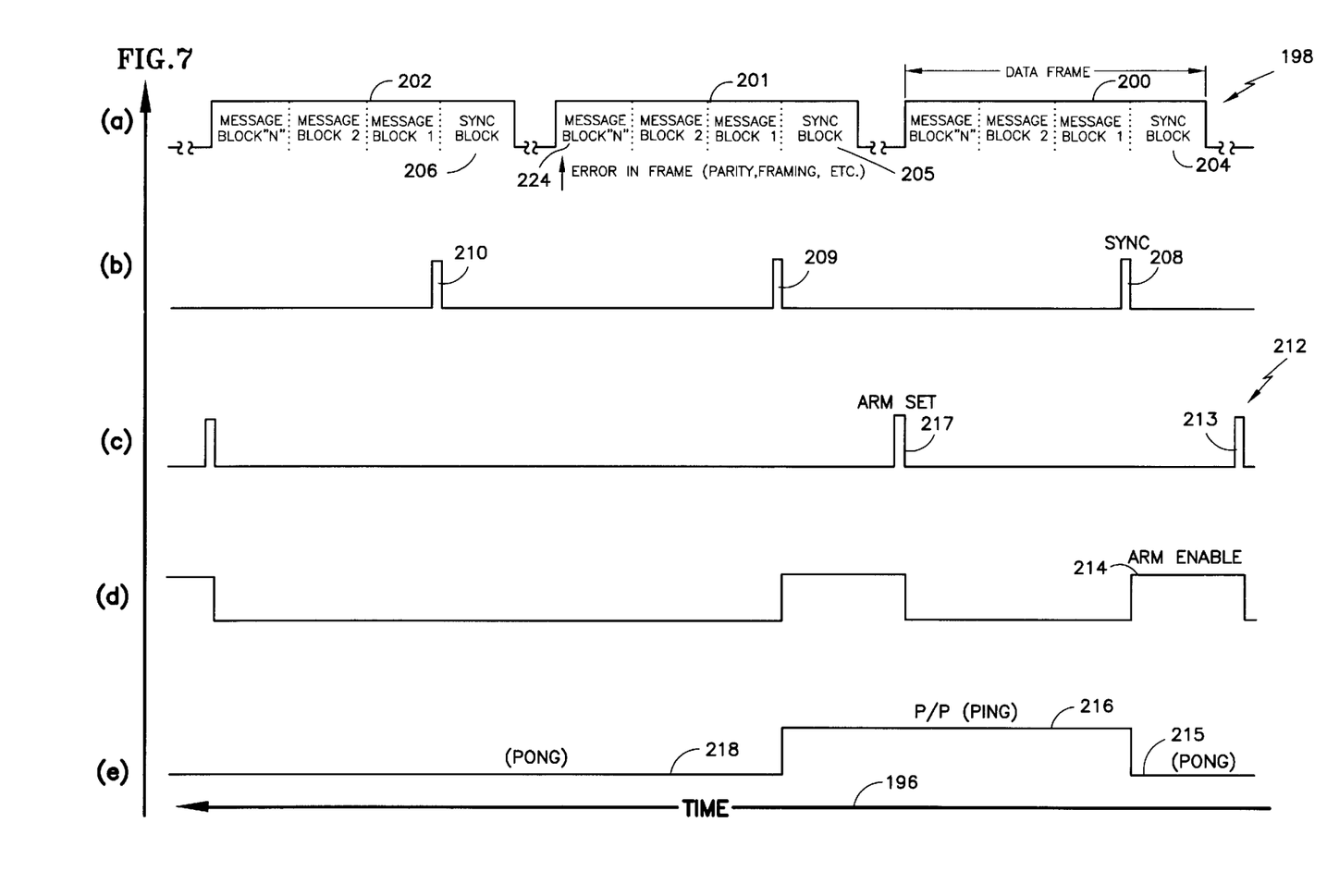
FIG. 7 is a waveform illustration which is used in describing the operation of the present invention.

Referring now to FIG. 7, illustrations (a)–(e) demonstrate the timing diagram for the channel receiver 126. Once again time is increasing from right to left along the FIG. 7 abscissa 196. Illustration (a) is the received CSDB message waveform 198 with data frames 200–202, each with Synch Blocks 204–206. Assuming the occurrence of six consecutive A5 hexadecimal patterns in each of the Synch Blocks 204–206, the Sync and Toggle Circuit 74 (FIG. 3) associated with receiver channel 126 (FIG. 5) provides, in illustration (b), Synch Pulses 208–210 on lines 84 to the latch 104 (FIG. 3); indicating an "interrupt pending" message on lines 108, 22 to the ASC 12.

Illustration (c), waveform 212 illustrates the ARM set signal provided by the ASC on lines 82 to the ARM set register 81 (FIG. 3). An ARM set pulse 213 sets the ARM signal at the output of the ARM latch 100 (FIG. 4) HIGH, as shown in illustration (d) with the ARM enable pulse 214. With the occurrence of the Synch Pulse 208 in the presence of the ARM enable 218, the toggle logic circuit 102 (FIG. 4) changes states from a LOW 215 to a HIGH 216, indicating the address location for the storage of the data messages contained in data frame 200.

While the Synch Pulse appears at each occurrence of the detection of the required six consecutive A5 hex signal patterns, the ASC does not provide the ARM set pulse (waveform 212) in the event of a message error as indicated within the message block provided by the RAM controller 146 on I/O bus 162 (FIG. 5). As an example, in FIG. 7 data frame 201 is assumed to have a frame or parity error in message block "N" 224. Although the Synch Pulse 209 does occur and in conjunction with the ARM set signal 217 causes the P/P to toggle to state 218, the ASC does not provide an ARM set signal at the conclusion of the data frame and the P/P signal does not toggle, and instead remains in state 218.

The CSDB interface apparatus of the present invention provides a low cost, reliable translator for converting the CSDB signal format and protocol to one that is acceptable to the ASC. The known alternative systems, including a microprocessor based conversion, are expensive. The present CSDB interface may be used with any type of host processor, i.e., any type of "client" processor which is required to interface with the CSDB-type bus.

Similarly, although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. Apparatus, for translating the signal protocol of serial bit message blocks presented from identified signal sources over a Commercial Standard Digital Bus (CSDB) to a host computer in each of a plurality of succeeding frames, each frame including a synchronization message block followed by one or more data message blocks, each data message block having an address byte which identifies its subject content, and a known number of data bytes, each data byte having a plurality of data bits and a parity bit, the apparatus comprising:

CSDB interface circuitry, including a serial receiver for receiving the CSDB frames and for providing each at a signal output thereof, and including detection circuitry for providing a synch enable signal in response to the presence of a synchronization message in each received frame;

control logic circuitry, including a receiver channel responsive to said signal output of said interface circuitry, for accepting and rejecting each received frame in the presence and absence, respectively, of said synch enable signal, and including decode circuitry for identifying the signal characteristics of each accepted frame message from its address byte, said receiver channel translating the CSDB signal protocol of each identified subject data byte to the signal protocol of the host computer and writing said translated protocol data byte to an assigned address location in signal memory; and signal memory, having a plurality of addressable signal storage locations partitioned into different address groups, each said different address group storing therein translated protocol data bytes having a different signal characteristics, as written thereto by said control logic circuitry, each said group being accessible by the host computer for retrieval of said translated protocol data bytes stored therein.

2. The apparatus of claim 1:

wherein said signal characteristics identified by said decode circuitry include identification of a frame as being associated with an identified signal source, as indicated by a frame identification signal provided by said decode circuitry; and wherein each said different address group receives and stores therein said translated protocol data bytes from an identified common signal source, as indicated by said frame identification signal.

3. The apparatus of claim 2:

wherein said signal characteristics identified by said decode circuitry further includes identification of the subject content of each message block within each identified frame, as indicated by a message identification signal provided by said decode circuitry; and wherein each said different address group is partitioned into different address sub-groups, each said different address sub-group receiving and storing therein said translated protocol data bytes having a common subject content from a common signal source, as indicated by said frame identification signal and said message subject identification signal from said decode circuitry.

4. The apparatus of claim 3:

wherein each said different address sub-group includes first and second address locations to which said control logic circuitry writes each succeeding translated protocol byte having a common subject content, from a common signal source, in alternating fashion to an available one of said first and second address locations; and wherein the host computer retrieves said translated protocol signal bytes from said first and second address locations in alternating fashion, and provides a signal manifestation to said control logic circuitry indicative of the available one of said first and second address locations as that location from which a data bytes has been most recently retrieved by the host computer.

5. The apparatus of claim 4, wherein said control logic circuitry signal writes said succeeding translated protocol bytes for storage at said first and second address locations, and the host computer retrieves the stored translated protocol bytes from said first and second address locations, in an ordered, cyclic fashion, in dependence on said signal manifestation.

6. The apparatus of claim 5, wherein said signal manifestation is a bistable signal, the alternating states of which correspond to an assigned one of said first and second address locations, the presence of each said assigned state being indicative of the availability of its associated address location for signal storage of a translated protocol byte by said control logic circuitry.

7. The apparatus of claim 1, wherein said control logic circuitry further includes CSDB protocol error circuitry responsive to each said accepted frame for determining the presence of the known number of data bytes in each message block, and for preventing said translation of a message block having an incorrect number of data bytes.

8. The apparatus of claim 7, wherein said CSD protocol error circuitry is further responsive to the parity bit in each data byte, for preventing said translation of a data byte having an incorrect parity.

9. The apparatus of claim 1, wherein said serial receiver of said CSDB interface circuitry provides buffered storage of each received CSDB frame pending the acceptance and, alternately, the rejection of the received frame by said control logic circuitry.

10. The apparatus of claim 9, wherein said serial receiver is a Universal Asynchronous Receiver Transmitter (UART).

11. The method of translating the signal protocol of serial bit message blocks presented from identified signal sources over a Commercial Standard Digital Bus (CSDB) to a host computer in each of a plurality of succeeding frames, each frame including a synchronization message block followed by one or more data message blocks, each data message block having an address byte which identifies its subject content, and a known number of data bytes, each data byte having a plurality of data bits and a parity bit, the method comprising:

receiving the CSDB frames and providing a synch enable signal in response to the presence of a synchronization message in each received frame;

accepting and rejecting each received frame in the presence and absence, respectively, of said synch enable signal:

identifying the signal characteristics of each accepted frame message from its address byte;

translating the CSDB signal protocol of each identified subject data byte to the signal protocol of the host computer;

providing plural groups of address locations in signal memory, each said address group being accessible to the host computer; and storing said translated protocol data byte to address locations in assigned one of said groups of address locations in dependence on the signal characteristics of said translated protocol data bytes.

12. The method of claim 11:

wherein the step of providing includes:

identifying each accepted frame as being associated with an identified signal source, and designating different ones of said address groups as being associated with different ones of the signal sources; and wherein the step of storing includes;

writing the translated protocol data bytes from an identified common signal source to an address location in the associated one of said address groups.

13. The method of claim 12 wherein the step of designating includes:

dividing each said address group, as a parent group, into one or more sub-groups of addressable locations; and assigning each said address sub-group to receive, for storage therein, translated protocol data bytes having a common subject content and received from the signal source associated with said parent group.

14. The method of claim 13, wherein said step of assigning further includes:

establishing first and second address locations in each said different address sub-group to which said control logic circuitry writes each succeeding translated protocol byte having a common subject content, from a common signal source, in alternating fashion to an available one of said first and second address locations, whereby the host computer retrieves each stored translated protocol signal byte from said first and second address locations in alternating fashion, and provides a signal manifestation of the available one of said first and second address locations as that location from which a data bytes has been most recently retrieved by the host computer.

15. The method of claim 14, wherein said step of storing includes:

writing said succeeding translated protocol bytes for storage at said first and second address locations in an ordered, cyclic fashion, in dependence on said signal manifestation.

16. The method of claim 15, wherein said signal manifestation in said step of establishing, is a bistable signal, the alternating states of which correspond to an assigned one of said first and second address locations, the presence of a given one of the bistable signal states being indicative of the availability of its associated address location for signal storage of a translated protocol byte.

17. The method of claim 11, further including:

determining the presence of the known number of data bytes in each message block, and preventing said translating of a message block having an incorrect number of data bytes.

18. The method of claim 17, further including:

checking the state of the parity bit in each data byte, for preventing said translating of a data byte having an incorrect parity.

* * * * *